United States Patent
Ju

(10) Patent No.: US 8,290,057 B2
(45) Date of Patent: Oct. 16, 2012

(54) METHOD OF DECODING A DIGITAL VIDEO SEQUENCE AND RELATED APPARATUS

(75) Inventor: Chi-Cheng Ju, Hsin-Chu (TW)

(73) Assignee: Mediatek Incorporation, Science-Based Industrial Park, Hsin-Chu Hsien (TW)

( * ) Notice: Subject to any disclaimer, the term of this patent is extended or adjusted under 35 U.S.C. 154(b) by 2139 days.

(21) Appl. No.: 10/906,403

(22) Filed: Feb. 18, 2005

(65) Prior Publication Data

US 2006/0188023 A1    Aug. 24, 2006

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.22

(58) Field of Classification Search ............ 375/240.01–240.07, 140.12–240.16, 240.22, 240.25–240.26
See application file for complete search history.

(56) References Cited

U.S. PATENT DOCUMENTS

| | | | |
|---|---|---|---|
| 5,502,493 A * | 3/1996 | Meyer ................. | 375/240.26 |
| 5,541,594 A * | 7/1996 | Huang et al. ........... | 341/51 |
| 5,644,361 A | 7/1997 | Ran et al. | |
| 5,777,677 A | 7/1998 | Linzer et al. | |
| 6,002,438 A | 12/1999 | Hocevar et al. | |
| 6,028,635 A | 2/2000 | Owen et al. | |
| 6,122,433 A * | 9/2000 | McLaren .............. | 386/326 |
| 6,222,886 B1 | 4/2001 | Yogeshwar | |
| 6,243,421 B1 | 6/2001 | Nakajima et al. | |
| 6,438,168 B2 * | 8/2002 | Arye .................. | 375/240.03 |
| 6,480,542 B1 | 11/2002 | Prange et al. | |
| 6,650,707 B2 * | 11/2003 | Youn et al. ........... | 375/240.12 |
| 6,668,019 B1 | 12/2003 | Owen et al. | |
| 6,807,312 B2 * | 10/2004 | Thomas et al. ........ | 382/253 |
| 6,925,119 B2 * | 8/2005 | Bartolucci et al. ..... | 375/240.03 |
| 7,212,576 B2 * | 5/2007 | Nagai et al. .......... | 375/240.27 |
| 7,277,484 B2 * | 10/2007 | Kim et al. ............ | 375/240.04 |
| 7,499,495 B2 * | 3/2009 | Srinivasan ........... | 375/240.16 |
| 8,054,883 B2 * | 11/2011 | Filippini et al. ....... | 375/240.16 |
| 2001/0016078 A1 * | 8/2001 | Go .................... | 382/240 |
| 2003/0128882 A1 | 7/2003 | Kim et al. | |
| 2004/0158878 A1 * | 8/2004 | Ratnakar et al. ....... | 725/150 |

FOREIGN PATENT DOCUMENTS

CN    1437408 A    8/2003

\* cited by examiner

*Primary Examiner* — Nhon Diep
(74) *Attorney, Agent, or Firm* — Winston Hsu; Scott Margo

(57) ABSTRACT

A method for decoding a digital video sequence includes decoding a first picture in the sequence; reducing a data size of the decoded first picture by vector quantizing at least one component of the first picture, the quantized component selected from the luminance and chrominance components of the first picture; storing a reduced data size representation of the decoded first picture to a memory; reading a region of interest of the reduced data size representation of the decoded first picture; and decoding a region of interest of a second picture in the sequence according to the region of interest of the reduced data size representation of the decoded first picture.

34 Claims, 12 Drawing Sheets

METHOD OF DECODING A DIGITAL VIDEO SEQUENCE AND RELATED APPARATUS

BACKGROUND

The invention relates to digital video decoding, and more particularly, to a method and apparatus for digital video decoding having reduced memory requirements.

The Moving Picture Experts Group (MPEG) MPEG-2 standard (ISO-13818) is utilized with video applications. The MPEG-2 standard describes an encoded and compressed bit-stream that has substantial bandwidth reduction. The compression is a subjective loss compression followed by a lossless compression. The encoded, compressed digital video data is subsequently decompressed and decoded by an MPEG-2 standard compliant decoder.

The MPEG-2 standard specifies a bit-stream from and a decoder for a very high compression technique that achieves overall image bit-stream compression not achievable with either intraframe coding alone or interframe coding alone, while preserving the random access advantages of pure intraframe coding. The combination of block based frequency domain intraframe encoding and interpolative/predictive interframe encoding of the MPEG-2 standard results in a combination of intraframe encoding advantages and interframe encoding advantages.

The MPEG-2 standard specifies predictive and interpolative interframe encoding and frequency domain intraframe encoding. Block based motion compensation is utilized for the reduction of temporal redundancy, and block based Discrete Cosine Transform based compression is utilized for the reduction of spatial redundancy. Under the MPEG-2 standard, motion compensation is achieved by predictive coding, interpolative coding, and variable length coded motion vectors. The information relative to motion is based on a 16×16 array of pixels and is transmitted with the spatial information. Motion information is compressed with Variable Length Codes, such as Huffman codes.

In general, there are some spatial similarities in chromatic, geometrical, or other characteristic values within a picture/image. In order to eliminate these spatial redundancies, it is required to identify important elements of the picture and to remove the redundant elements that are less important. For example, according to the MPEG-2 standard, a picture is compressed by eliminating the spatial redundancies by chrominance sampling, discrete cosine transform (DCT), and quantization. In addition, video data is actually formed by a continuous series of pictures, which are perceived as a moving picture due to the persistence of pictures in the vision of human eyes. Since the time interval between pictures is very short, the difference between neighboring pictures is very tiny and mostly appears as a change of location of visual objects. Therefore, the MPEG-2 standard eliminates temporal redundancies caused by the similarity between pictures to further compress the video data.

In order to eliminate the temporal redundancies mentioned above, a process referred to as motion compensation is employed in the MPEG-2 standard. Motion compensation relates to the redundancy between pictures. Before performing motion compensation, a current picture to be processed is typically divided into 16×16 pixel sized macroblocks (MB). For each current macroblock, a most similar prediction block of a reference picture is then determined by comparing the current macroblock with "candidate" macroblocks of a preceding picture or a succeeding picture. The most similar prediction block is treated as a reference block and the location difference between the current block and the reference block is then recorded as a motion vector. The above process of obtaining the motion vector is referred to as motion estimation. If the picture to which the reference block belongs is prior to the current picture, the process is called forward prediction. If the reference picture is posterior to the current picture, the process is called backward prediction. In addition, if the motion vector is obtained by referring both to a preceding picture and a succeeding picture of the current picture, the process is called bi-directional prediction. A commonly employed motion estimation method is a block-matching method. Because the reference block may not be completely the same with the current block, when using block-matching, it is required to calculate the difference between the current block and the reference block, which is also referred to as a prediction error. The prediction error is used for decoding the current block.

The MPEG 2 standard defines three encoding types for encoding pictures: intra encoding, predictive encoding, and bi-directionally predictive encoding. An intra-coded picture (I-picture) is encoded independently without using a preceding picture or a succeeding picture. A predictive encoded picture (P-picture) is encoded by referring to a preceding reference picture, wherein the preceding reference picture should be an I-picture or a P-picture. In addition, a bi-directionally predictive picture (B-picture) is encoded using both a preceding picture and a succeeding picture. Bi-directionally predictive pictures (B-pictures) have the highest degree of compression and require both a past picture and a future picture for reconstruction during decoding. It should also be noted that B-pictures are not used as reference pictures. Because I-pictures and P-pictures can be used as a reference to decode other pictures, the I-pictures and P-pictures are also referred to as reference pictures. As B-pictures are never used to decode other pictures, B-pictures are also referred to as non-reference pictures. Note that in other video compression standards such as SMPTE VC-1, B field pictures can be used as a reference to decode other pictures. Hence, the picture encoding types belonging to either reference pictures or non-reference pictures may vary according to different video compression standards.

As mentioned above, a picture is composed of a plurality of macro-blocks, and the picture is encoded macro-block by macro-block. Each macro-block has a corresponding motion type parameter representing its motion compensation type. In the MPEG 2 standard, for example, each macro-block in an I-picture is intra-coded. P-pictures can comprise intra-coded and forward motion compensated macro-blocks; and B-pictures can comprise intra-coded, forward motion compensated, backward motion compensated, and bi-directional motion compensated macro-blocks. As is well known in the art, an intra-coded macro-block is independently encoded without using other macro-blocks in a preceding picture or a succeeding picture. A forward motion compensated macro-block is encoded by using the forward prediction information of a most similar macro-block in the preceding picture. A bi-directional motion compensated macro-block is encoded by using the forward prediction information of a reference macro-block in the preceding picture and the backward prediction information of another reference macro-block in the succeeding picture. The formation of P-pictures from I-pictures, and the formation of B-pictures from a pair of past and future pictures are key features of the MPEG-2 standard.

FIG. 1 shows a conventional block-matching process of motion estimation. A current picture 120 is divided into blocks as shown in FIG. 1. Each block can be any size. For example, in the MPEG standard, the current picture 120 is typically divided into macro-blocks having 16×16 pixels.

Each block in the current picture 120 is encoded in terms of its difference from a block in a preceding picture 110 or a succeeding picture 130. During the block-matching process of a current block 100, the current block 100 is compared with similar-sized "candidate" blocks within a search range 115 of the preceding picture 110 or within a search range 135 of the succeeding picture 130. The candidate block of the preceding picture 110 or the succeeding picture 130 that is determined to have the smallest difference with respect to the current block 100, e.g. a block 150 of the preceding picture 110, is selected as a reference block. The motion vectors and residues between the reference block 150 and the current block 100 are computed and coded. As a result, the current block 100 can be restored during decompression using the coding of the reference block 150 as well as the motion vectors and residues for the current block 100.

The motion compensation unit under the MPEG-2 Standard is the macroblock unit. The MPEG-2 standard sized macroblocks are 16×16 pixels. Motion information consists of one vector for forward predicted macroblocks, one vector for backward predicted macroblocks, and two vectors for bi-directionally predicted macroblocks. The motion information associated with each macroblock is coded differentially with respect to the motion information present in the reference macroblock. In this way a macroblock of pixels is predicted by a translation of a macroblock of pixels from a past or future picture. The difference between the source pixels and the predicted pixels is included in the corresponding bit-stream. That is, the output of the video encoder is a digital video bit-stream comprising encoded pictures that can be decoded by a decoder system.

FIG. 2 shows difference between the display order and the transmission order of pictures of the MPEG-2 standard. As mentioned, the MPEG-2 standard provides temporal redundancy reduction through the use of various predictive and interpolative tools. This is illustrated in FIG. 2 with the use of three different types of frames (also referred to as pictures): "I" intra-coded pictures, "P" predicted Pictures, and "B" bi-directional interpolated pictures. As shown in FIG. 2, in order to decode encoded pictures being P-pictures or B-pictures, the picture transmission order in the digital video bit-stream is not the same as the desired picture display order.

A decoder adds a correction term to the block of predicted pixels to produce the reconstructed block. Typically, a video decoder receives the digital video bit-stream and generates decoded digital video information, which is stored in an external memory area in frame buffers. As described above and illustrated in FIG. 2, each macroblock of a P-picture can be coded with respect to the closest previous I-picture, or with respect to the closest previous P-picture. That is, each macroblock of a B-picture can be coded by forward prediction from the closest past I-picture or P-picture, by backward prediction from the closest future I-picture or P-picture, or bi-directionally using both the closest past I-picture or P-picture and the closest future I-picture or P-picture. Therefore, in order to properly decode all the types of encoded pictures and display the digital video information, at least the following three frame buffers are required:

1. Past reference frame buffer
2. Future reference frame buffer
3. Decompressed B-frame buffer Each buffer must be large enough to hold a complete picture's worth of digital video data (e.g., 720×480 pixels for MPEG-2 Main Profile/Main Level). Additionally, as is well known by a person of ordinary skill in the art, both luma (short for luminance) data and chroma (short for chrominance) data require similar processing. In order to keep the cost of the video decoder products down, an important goal has been to reduce the amount of external memory (i.e., the size of the frame buffers) required to support the decode function.

SUMMARY

Methods and apparatuses for decoding pictures in a digital video sequence are provided. An exemplary embodiment of a method for decoding a digital video sequence comprises: decoding a first picture in the sequence; reducing a data size of the decoded first picture by vector quantizing at least one component of the first picture, the quantized component selected from the luminance and chrominance components of the first picture; storing a reduced data size representation of the decoded first picture to a memory; reading a region of interest of the reduced data size representation of the decoded first picture; and decoding a region of interest of a second picture in the sequence according to the region of interest of the reduced data size representation of the decoded first picture.

An exemplary embodiment of a method of decoding a digital video sequence comprises: decoding a first picture in the sequence; adding a randomly generated value to at least one component of the decoded first picture; reducing a data size of the decoded first picture by quantizing the at least one component of the first picture, the quantized component selected from the luminance and chrominance components of the first picture; storing a reduced data size representation of the decoded first picture to a memory; inverse quantizing a region of interest of the reduced data size representation of the decoded first picture; and decoding a region of interest of a second picture in the sequence according to the region of interest of the reduced data size representation of the decoded first picture.

An exemplary embodiment of a method of decoding a digital video sequence comprises: decoding a first picture in the sequence; reducing a data size of the decoded first picture by downsampling at least one component of the first picture and then quantizing the at least one downsampled component of the first picture, the quantized component selected from the luminance and chrominance components of the first picture; storing a reduced data size representation of the decoded first picture to a memory; reading a region of interest of the reduced data size representation of the decoded first picture; and decoding a region of interest of a second picture in the sequence according to the region of interest of the reduced data size representation of the decoded first picture.

An exemplary embodiment of an apparatus for decoding a digital video sequence comprises: a first decoding means for decoding a first picture in the sequence; a data size reducing means for reducing a data size of the decoded first picture by vector quantizing at least one component of the first picture, the quantized component selected from the luminance and chrominance components of the first picture; a memory for storing a reduced data size representation of the decoded first picture; a means for reading a region of interest of the reduced data size representation of the decoded first picture; and a second decoding means for decoding a region of interest of a second picture in the sequence according to the region of interest of the reduced data size representation of the decoded first picture.

An exemplary embodiment of an apparatus for decoding a digital video sequence comprises: a first decoding means for decoding a first picture in the sequence; a data size reducing means for adding a randomly generated value to at least one component of the decoded first picture, and for reducing a data size of the decoded first picture by quantizing the at least one component of the first picture, the quantized component selected from the luminance and chrominance components of the first picture; a memory for storing a reduced data size representation of the decoded first picture; an inverse quantizer for inverse quantizing a region of interest of the reduced data size representation of the decoded first picture; and a second decoding means for decoding a region of interest of a second picture in the sequence according to the region of interest of the reduced data size representation of the decoded first picture.

An exemplary embodiment of an apparatus for decoding a digital video sequence comprises: a first decoding means for decoding a first picture in the sequence; a data size reducing means for reducing a data size of the decoded first picture by downsampling at least one component of the first picture and then quantizing the at least one downsampled component of the first picture, the quantized component selected from the luminance and chrominance components of the first picture; a memory for storing a reduced data size representation of the decoded first picture; a means for reading a region of interest of the reduced data size representation of the decoded first picture; and a second decoding means for decoding a region of interest of a second picture in the sequence according to the region of interest of the reduced data size representation of the decoded first picture.

DETAILED DESCRIPTION

Figure 1:
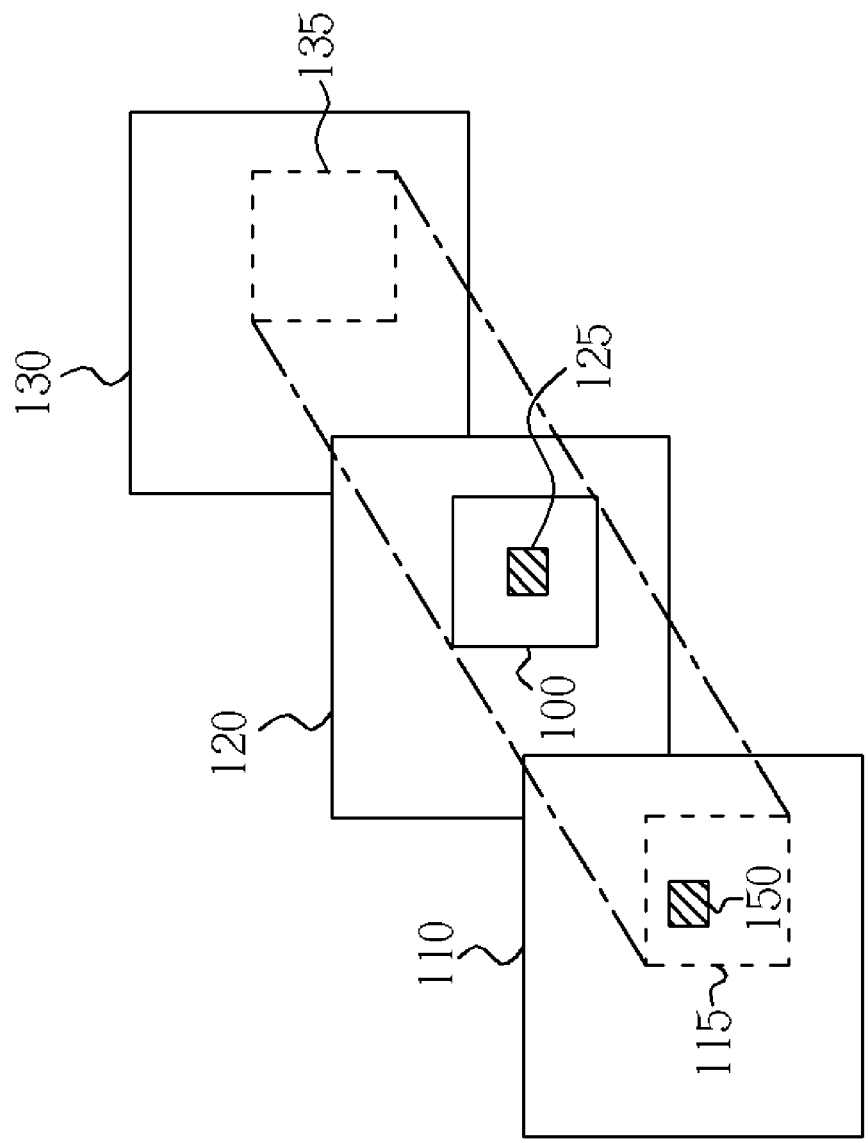
FIG. 1 is a diagram illustrating a conventional block-matching process utilized to perform motion estimation.
Figure 2:
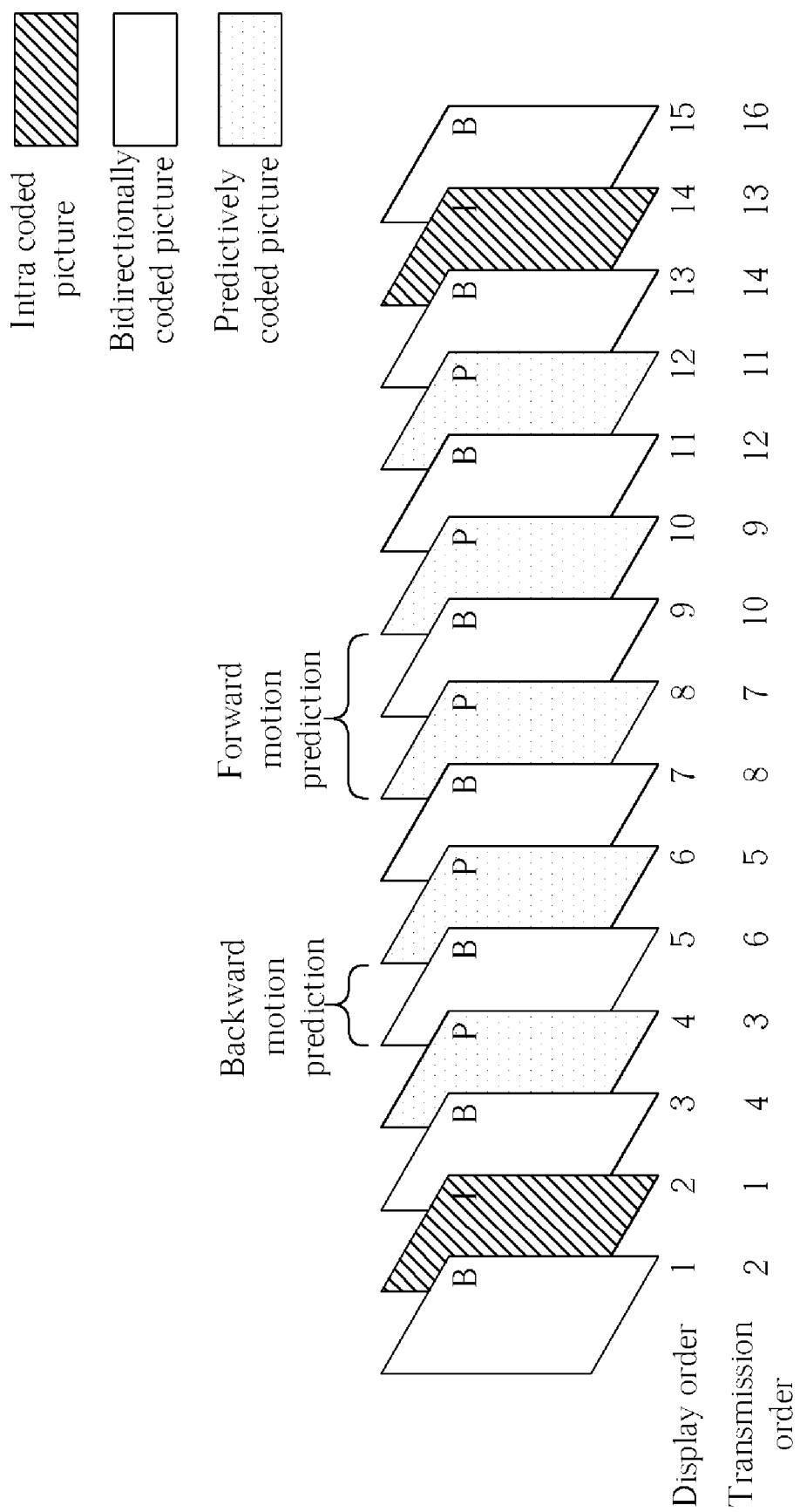
FIG. 2 is a diagram illustrating the difference between the display order and the transmission order of pictures of the MPEG-2 Standard.
Figure 3:
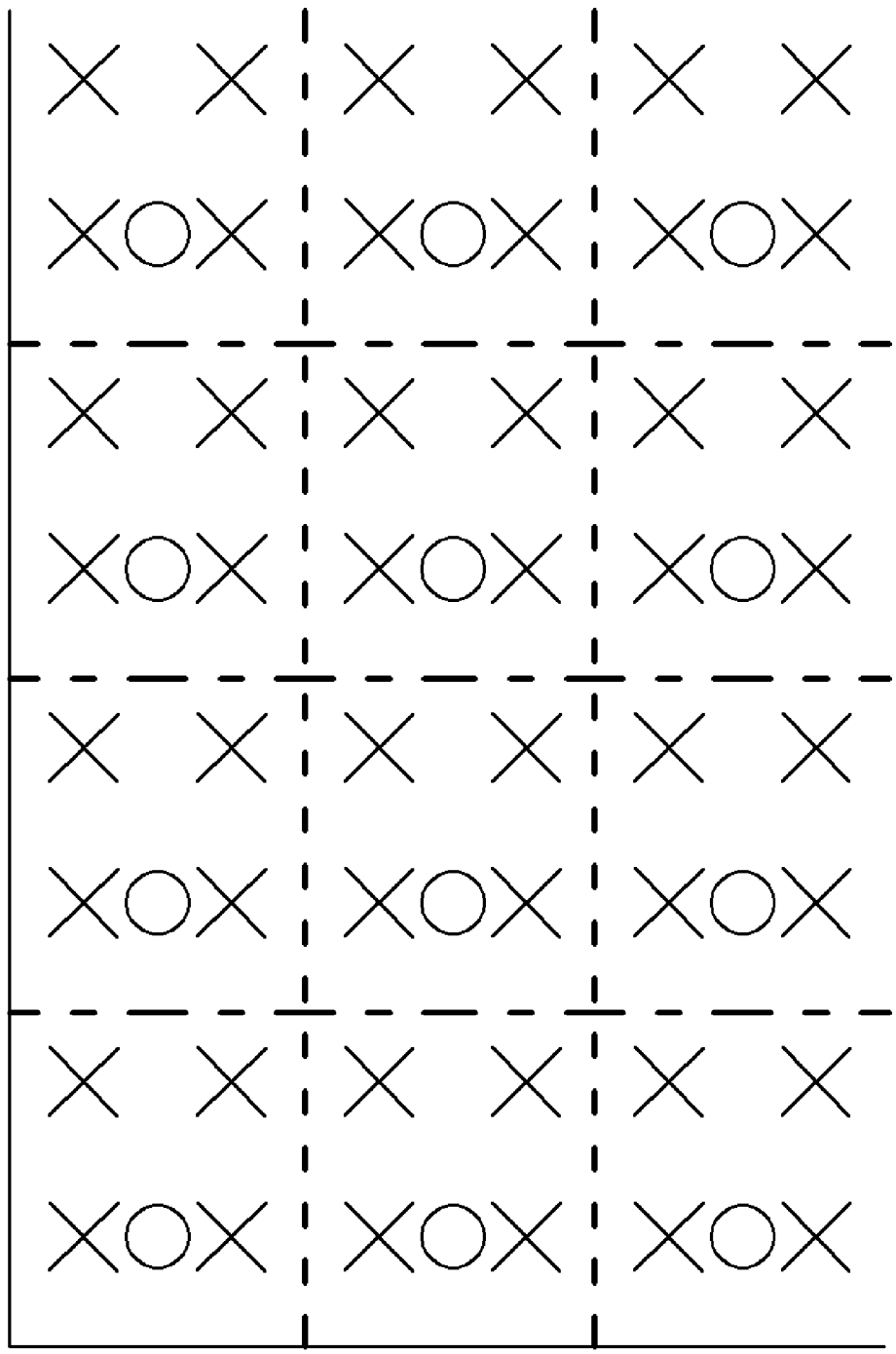
FIG. 3 illustrates a YUV 4:2:0 format.

Please refer to FIG. 3. FIG. 3 illustrates a YUV 4:2:0 format. The term YUV represents a color-difference video signal containing one luminance component (Y) and two chrominance components (U, V), and is also commonly referred to as YCbCr, where Cb and Cr are chrominance values corresponding to U and V, respectively. The terms YUV and YCbCr can be used interchangeably. In FIG. 3, the luminance samples (Y) are represented by an X and the chrominance samples (UV) are represented by an O.

As shown in FIG. 3, in the YUV 4:2:0 format, there is both a horizontal 2:1 downsampling and a vertical 2:1 downsampling of the chrominance samples UV. Thus, one pair of chrominance samples UV are shared for four pixels while each pixel includes its own luminance sample Y.

Figure 4:
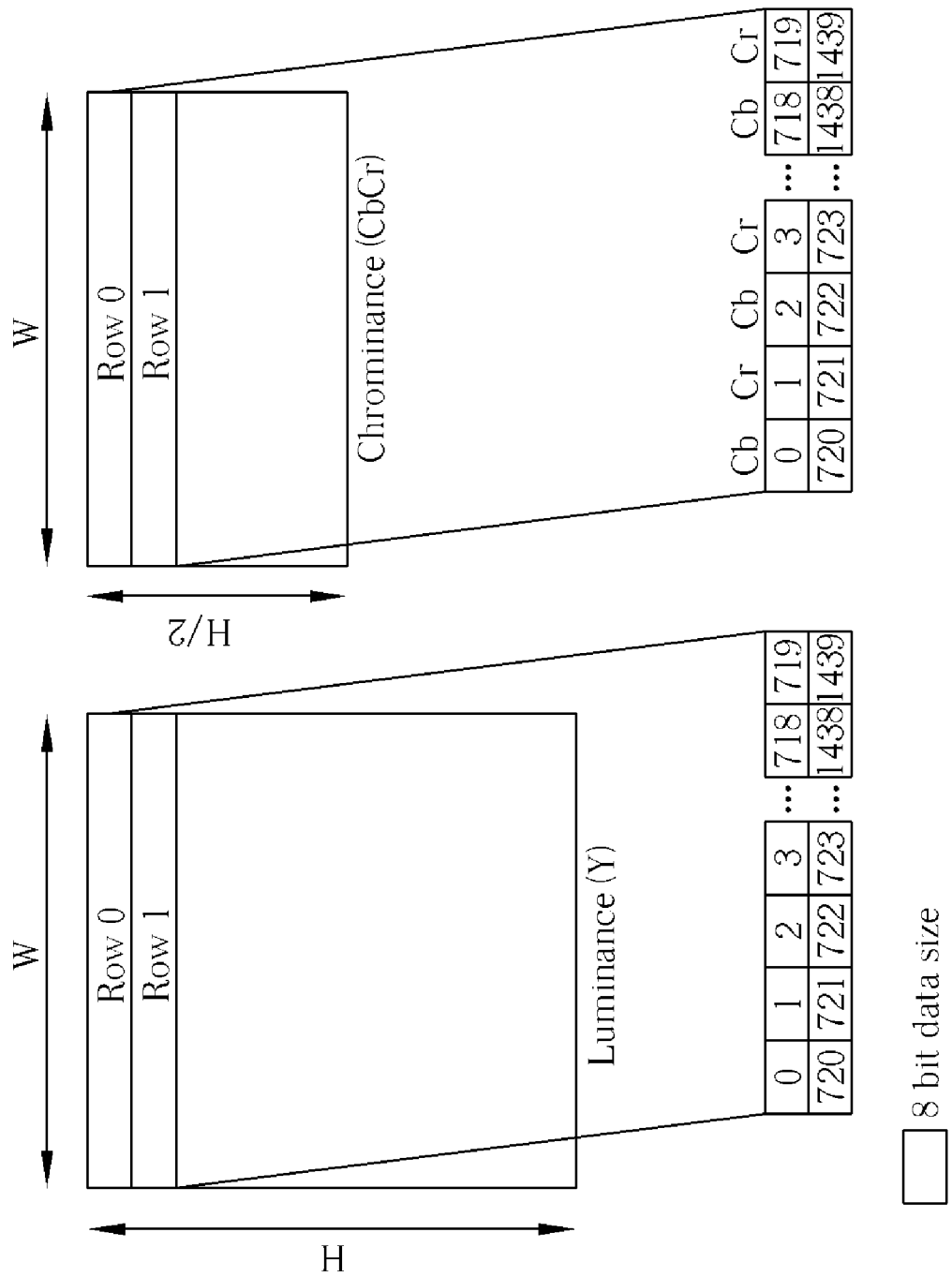
FIG. 4 is a diagram showing the relative number of bytes in a memory needed to store luminance and chrominance values using a YUV 4:2:0 format.

The YUV 4:2:0 sampling format is the most popular one in MPEG-2 video-coding systems. For example, a typical MPEG-2 Main Profile/Main Level video stream requires only the YUV 4:2:0 format. Memory allocation for various cases will be illustrated in FIG. 4 through FIG. 9, where reconstructed pictures are with height H and width W. Please refer to FIG. 4. FIG. 4 is a diagram showing the relative number of bytes in a memory needed to store luminance and chrominance values using a typical YUV 4:2:0 format. The left hand side of the diagram shows that each pixel in a picture frame has a corresponding luminance value Y. On the other hand, every four pixels of the picture frame have a corresponding pair of chrominance values UV, which are also labeled as CbCr in FIG. 4-FIG. 9. In a YUV 4:2:0 picture, the number of chrominance samples (Cb and Cr) is one-half of the number of luminance samples in the horizontal direction. Therefore, the resulting chrominance samples CbCr are stored in the same number of bytes as a row of luminance samples Y. As shown in FIG. 4, each row of both the luminance samples Y and the chrominance samples CbCr is stored in 720 bytes of memory. Similarly, since the number of chrominance samples (Cb and Cr) is one-half of luminance samples in the vertical direction, half as many rows are required to store the resulting chrominance samples CbCr as is required to store the luminance samples Y.

Since the human eye is more sensitive to brightness than color, the memory requirement for a picture, especially for a reference picture, can be reduced without a significant perceived loss in quality by further downsampling only the color or chrominance information. As a result, the memory requirement of a picture buffer can be reduced substantially by further downsampling the original 4:2:0 chrominance samples horizontally, vertically, or both horizontally and vertically.

Figure 5:
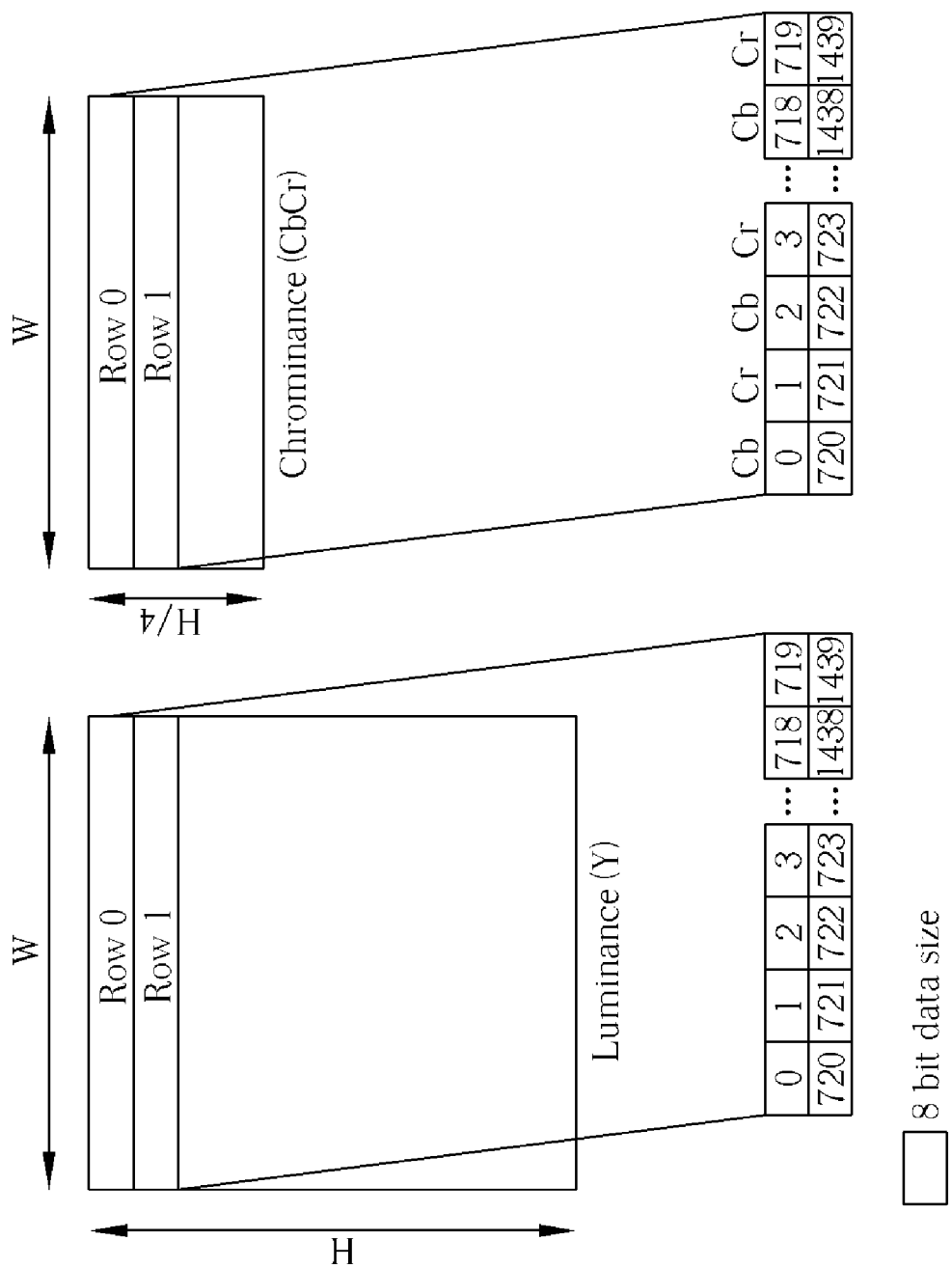
FIG. 5 is a diagram showing the relative number of bytes in a memory needed to store luminance and chrominance values of a YUV 4:2:0 format picture in which the chrominance values have been downsampled by a 2:1 ratio in the vertical direction.

Please refer to FIG. 5. FIG. 5 is a diagram of memory usage in an exemplary embodiment of a digital video decoding with reduced memory requirements, which shows the relative number of bytes in a memory needed to store luminance and chrominance values of a YUV 4:2:0 format picture. In the case of FIG. 5, the chrominance values have been further downsampled by a 2:1 ratio in the vertical direction. As can be seen by comparing FIG. 4 and FIG. 5, half as many rows of chrominance samples CbCr are used, thereby requiring half as much memory for storing the chrominance samples CbCr. Note that FIG. 4 to FIG. 9 are depicted in the context of the use of a picture size of 720×480 with the 4:2:0 format, although embodiments are not limited to such a type of pictures.

Figure 6:
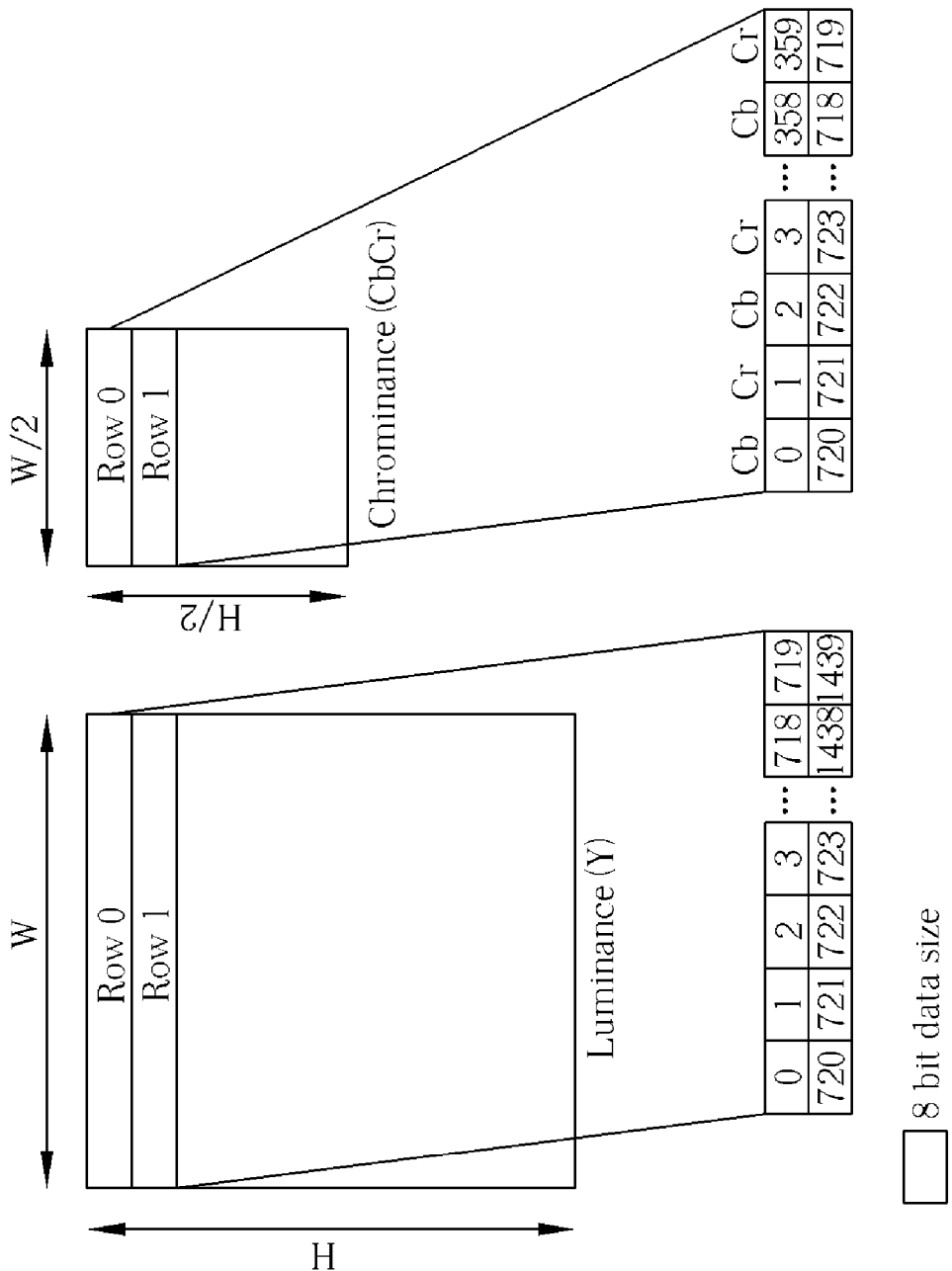
FIG. 6 is a diagram showing the relative number of bytes in a memory needed to store luminance and chrominance values of a YUV 4:2:0 format picture in which the chrominance values have been downsampled by a 2:1 ratio in the horizontal direction.

Please refer to FIG. 6. FIG. 6 is a diagram of memory usage in another embodiment of digital video decoding with reduced memory requirements, showing the relative number of bytes in a memory needed to store luminance and chrominance values of a YUV 4:2:0 format picture in which the chrominance values have been downsampled by a 2:1 ratio in the horizontal direction. As can be seen by comparing FIG. 4 and FIG. 6, each row of chrominance samples CbCr contains half as many chrominance samples CbCr, thereby requiring half as much memory for storing the chrominance samples CbCr. Thus, each row of the chrominance samples CbCr is stored in 360 bytes of memory.

In a similar way, some embodiments of digital video decoding downsample the chrominance values of a YUV 4:2:0 format picture by a 2:1 ratio in both the horizontal and vertical directions. Hence, only one-quarter of memory size is required in comparison with the original 4:2:0 chrominance samples.

The memory storage size of a video frame can also be reduced without a significant perceived loss in quality by quantizing the bit representation of only the color or chrominance information. Quantization refers to the process of approximating a continuous set of values in the image data with a finite (preferably small) set of values. The input to a quantizer is the original data, and the output is always one among a finite number of levels. The quantizer is a function whose set of output values are discrete, and usually finite. Obviously, this is a process of approximation, and a good quantizer is one which represents the original signal with minimum loss or distortion.

There are two types of quantization: scalar quantization and vector quantization. In scalar quantization, each input symbol is treated separately in producing the output, while in vector quantization the input symbols are clubbed together in groups called vectors, and processed to give the output. This clubbing of data and treating them as a single unit increases the optimality of the vector quantizer, but at the cost of increased computational complexity. Scalar quantization can be further divided into uniform and non-uniform quantization. Two examples of vector quantization are full search vector quantization (FSVQ) and classified vector quantization (CVQ). In the application of CVQ, blocks within a picture are first classified into shade blocks and edge blocks, and vector quantization is then performed on the shade blocks and the edge blocks, respectively.

A scalar quantizer can be specified by its input partitions and output levels (also called reproduction points). If the input range is divided into levels of equal spacing, then the quantizer is termed as a uniform quantizer, and if not, it is termed as a non-uniform quantizer. A uniform quantizer can be easily specified by its lower bound and the step size. Also, implementing a uniform quantizer is easier than a non-uniform quantizer. A vector quantizer is useful for providing high compression ratios while at the same time providing accurate quantization.

In the same way a quantizer partitions its input and outputs discrete levels, a dequantizer or inverse quantizer receives the output levels of a quantizer and converts them into normal data, by translating each level into a reproduction point in the actual range of data.

Figure 7:
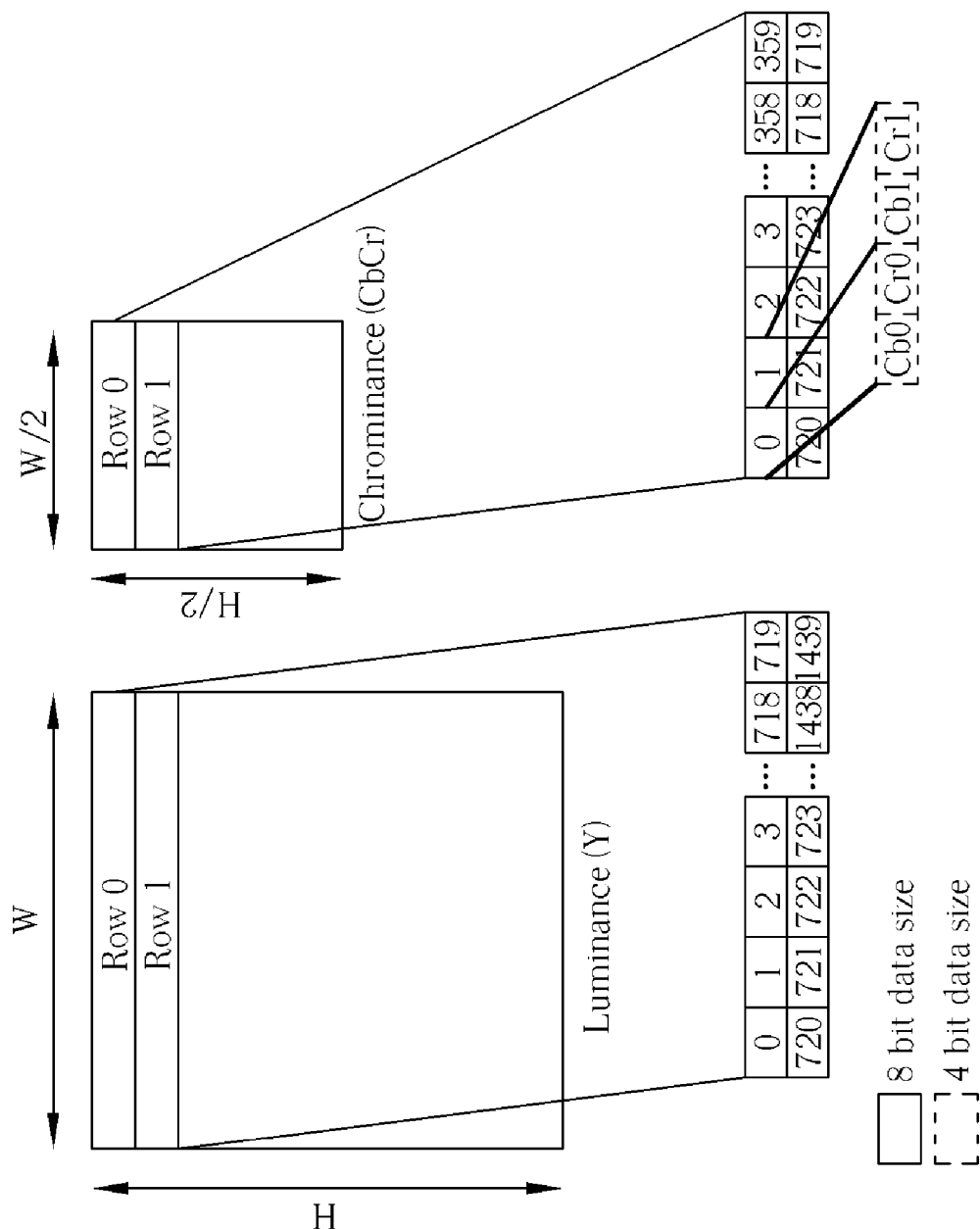
FIG. 7 is a diagram showing the relative number of bytes in a memory needed to store luminance and chrominance values of a YUV 4:2:0 format picture in which the chrominance values have been scalar quantized.

Some embodiments of digital video decoding with reduced memory requirements apply scalar quantization of picture samples, especially of chrominance samples. A scalar quantizer, which can be either a uniform or non-uniform scalar quantizer, is used to quantize the samples before storing. Please refer to FIG. 7. FIG. 7 is a diagram showing the relative number of bytes in a memory needed to store luminance and chrominance values of a YUV 4:2:0 format picture in which the chrominance values have been scalar quantized. As shown in FIG. 7, an original 8-bit Cb0 sample is scalar quantized as 4-bit data Cb0, and an original 8-bit Cr0 sample is also scalar quantized as 4-bit data Cr0. The 4-bit samples Cb0 and Cr0 are combined as an 8-bit byte and store in an 8-bit DRAM byte as shown in FIG. 7. As can be seen by comparing FIG. 4 and FIG. 7, each row of scalar quantized chrominance samples CbCr is stored using half as many bytes as non quantized chrominance samples CbCr, thereby reducing the amount of required memory by half. Thus, each row of the chrominance samples CbCr is stored in 360 bytes of memory.

In the cases that chroma samples of reference picture are scalar quantized and stored, when performing a motion compensation operation to read a prediction block from the scalar quantized chroma reference picture, the read out 8-bit scalar quantized data is inverse scalar quantized to restore the 16-bit Cb0Cr0 data before the data is used as a prediction block during motion compensation. On the other hand, the display control system (not shown) also performs inverse scalar quantization to inverse quantize the read out 8-bit scalar quantized data to the 16-bit Cb0Cr0 data before rendering the data to a display device.

In some embodiment, a dithering process is applied before scalar quantization of chroma samples to improve a wider range of quantized values and gain better performance. The maximum quantization error is caused when a measurement falls on the halfway point when scalar quantizing data. Since binary data is comprised of only 1s and 0s, on or off, high or low, etc., there is no halfway measurement. To help solve this problem, the dithering process is applied by adding a randomly generated value to chroma samples before performing scalar quantization on the chroma samples. Hence, dithering helps nudge values above or below the halfway point so that they can be rounded up or rounded down randomly. In this way, a greater range of quantized values can be created.

Figure 8:
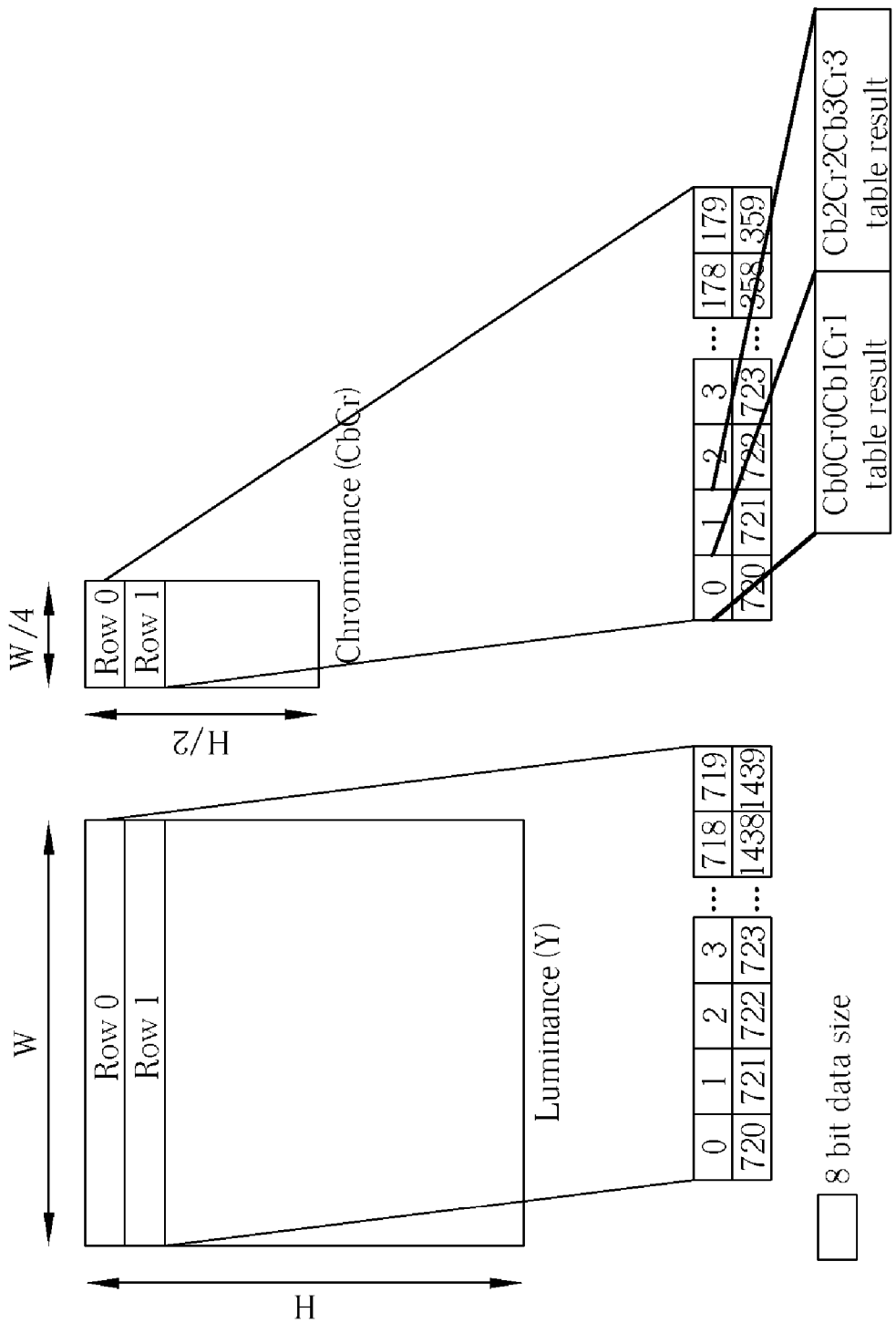
FIG. 8 is a diagram showing the relative number of bytes in a memory needed to store luminance and chrominance values of a YUV 4:2:0 format picture in which the chrominance values have been vector quantized.

Please refer to FIG. 8. FIG. 8 is a diagram of memory usage in another embodiment of digital video decoding with reduced memory requirements, showing the relative number of bytes in a memory needed to store luminance and chrominance values of a YUV 4:2:0 format picture in which the chrominance values have been vector quantized. Instead of scalar quantization, vector quantization can also be applied for reducing the amount of memory required to store chrominance samples. For instance, vector quantization can be applied to 4 adjacent samples of a row of a block. That is, 4 samples of a row of a block are vector quantized at the same time. The type of vector quantization used is preferably full search vector quantization (FSVQ), but can also be classified vector quantization (CVQ).

As shown in FIG. 8, 4 samples of a row of a block as used as an input vector. The process for establish a FSVQ codebook is described as follows. First, typical images are collected and training vectors are derived from analyzing sets of 4 chrominance samples, i.e. Cb(n) Cr(n) Cb(n+1) Cr(n+1). Then the VQ codebook is trained using the well-known LBG algorithm and establish a FSVQ codebook. The well-known LBG algorithm is explained in "An algorithm for vector quantizer design," by Y. Linde et al., as published in the IEEE Trans. on Communications, Vol. COM-28, no. 1, January 1980, which is herein incorporated by reference. In addition, the details of FSVQ can be found in *Vector Quantization and signal Processing*, by R. M. Gray and A. Gersho, as published by Kluwer Academic Publishers, 1991, which is also herein incorporated by reference. After the codebook is obtained, 4 samples of the rows of blocks (that is, input vectors) of a decoded picture are vector quantized, and the vector quantized result is stored into a picture buffer.

In FIG. 8, the four horizontal adjacent 8-bit chroma samples Cb0, Cr0, Cb1, and Cr1, are treated as a 32-bit input vector. Assuming the number of entries in the VQ codebook is 256, instead of storing 32 bits in the picture buffer, only $\log_2(256)=8$ bits VQ codebook index need to be stored in the picture buffer. Hence, only ¼ of the original 32 bits of data are stored in the picture buffer. In the cases where chroma samples of reference picture are vector quantized and stored, when performing a motion compensation operation to read a prediction block from the vector quantized chroma reference picture, the read 8-bit vector quantized data are used to look up the VQ codebook to restore the inverse vector quantized 32-bit Cb(n)Cr(n)Cb(n+1)Cr(n+1) data. As shown in FIG. 8, since the original 32 bits are vector quantized to become 8 bits, each row of the chrominance samples CbCr is stored in only 180 bytes of memory. On the other hand, the display control system (not shown) also performs inverse vector quantization to inverse quantize the read out 8-bit vector quantized data to obtain the inverse vector quantized 32-bit Cb(n)Cr(n)Cb(n+1)Cr(n+1) data before rendering the data to a display device.

Figure 9:
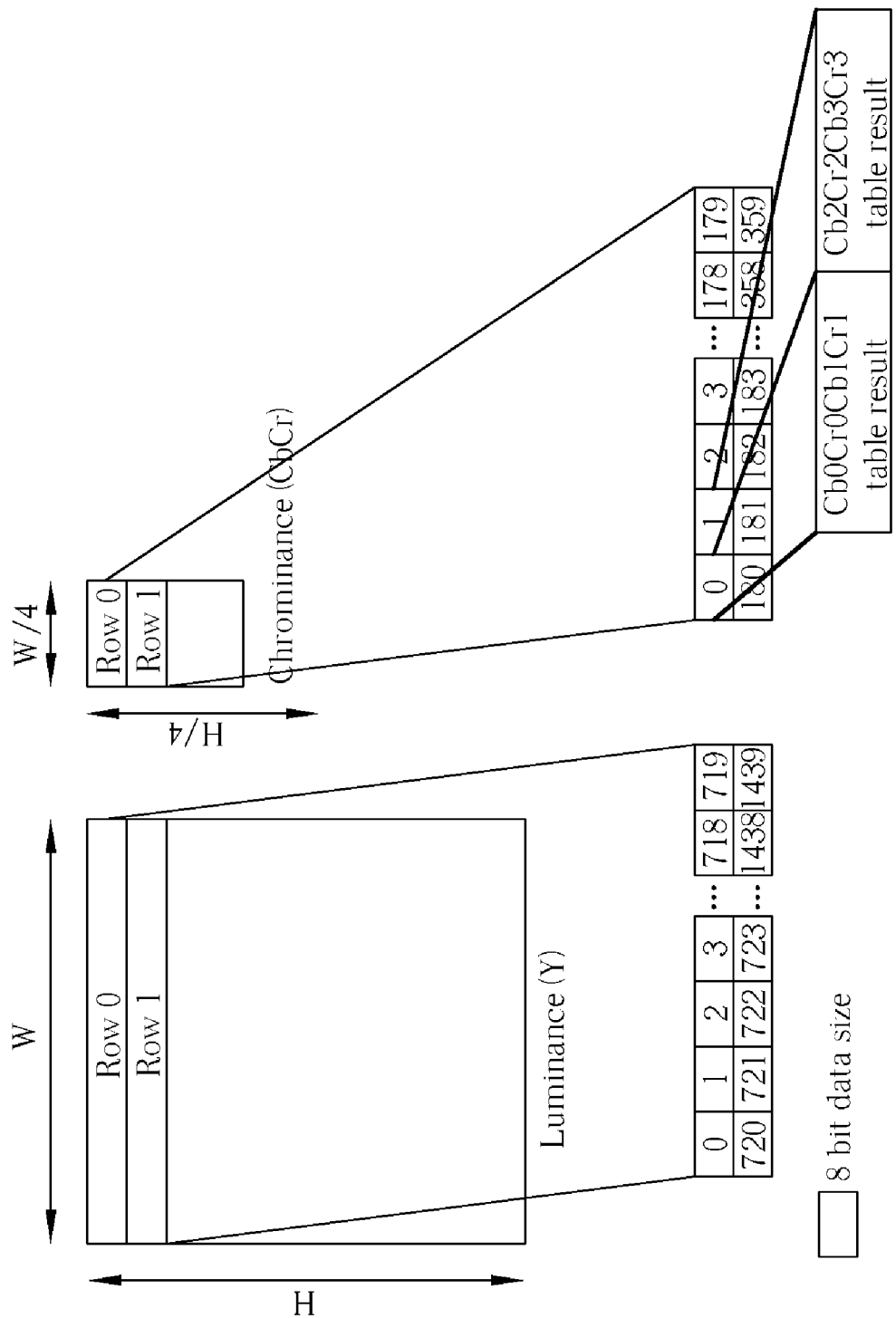
FIG. 9 is a diagram showing the relative number of bytes in a memory needed to store luminance and chrominance values of a YUV 4:2:0 format picture in which the chrominance values have been both vector quantized and downsampled by a 2:1 ratio in the vertical direction.

Please refer to FIG. 9. FIG. 9 is a diagram of memory usage in yet another embodiment of digital video decoding with reduced memory requirements, showing the relative number of bytes in a memory needed to store luminance and chrominance values of a YUV 4:2:0 format picture in which the chrominance values have been downsampled by a 2:1 ratio in the vertical direction and then vector quantized. FIG. 9 is identical to FIG. 8 except half as many rows of memory are required for storing the chrominance samples CbCr, thereby reducing the memory requirement by a factor of 2.

As mentioned above, besides using full search vector quantization (FSVQ), classified vector quantization (CVQ) can also be used. The most serious problem in the ordinary VQ is an edge degradation problem caused by employing the conventional distortion measures such as the mean square error (MSE). Since an edge is a very significant feature perceptually in the image, a faithful coding that preserves the edge integrity is very important. Unfortunately, the MSE does not possess any edge preserving property. In order to alleviate the edge degradation in VQ, B. Ramamurthi and A. Gersho introduced a classified VQ (CVQ) technique based on a composite source model in "Classified vector quantization of image," as published in the IEEE Trans. Commun, Vol. COM-34, pp. 1105-1115, November 1986, which is herein incorporated by reference. In the composite source model, the image is represented by the shade blocks and the blocks with an edge at a particular orientation and location. A classifier separates these two sources. Then the subblocks belong to a class are coded only with the codevectors of the same class in order to preserve the perceptual feature associated with each class. Therefore, since the CVQ technique preserves the perceptual features, such as an edge, associated with each class, the quality of reconstructed images can be improved significantly. Therefore, a block of an image can be treated as an input vector and a CVQ process can be applied to vector quantize these vectors and store the results into a picture buffer.

Figure 10:
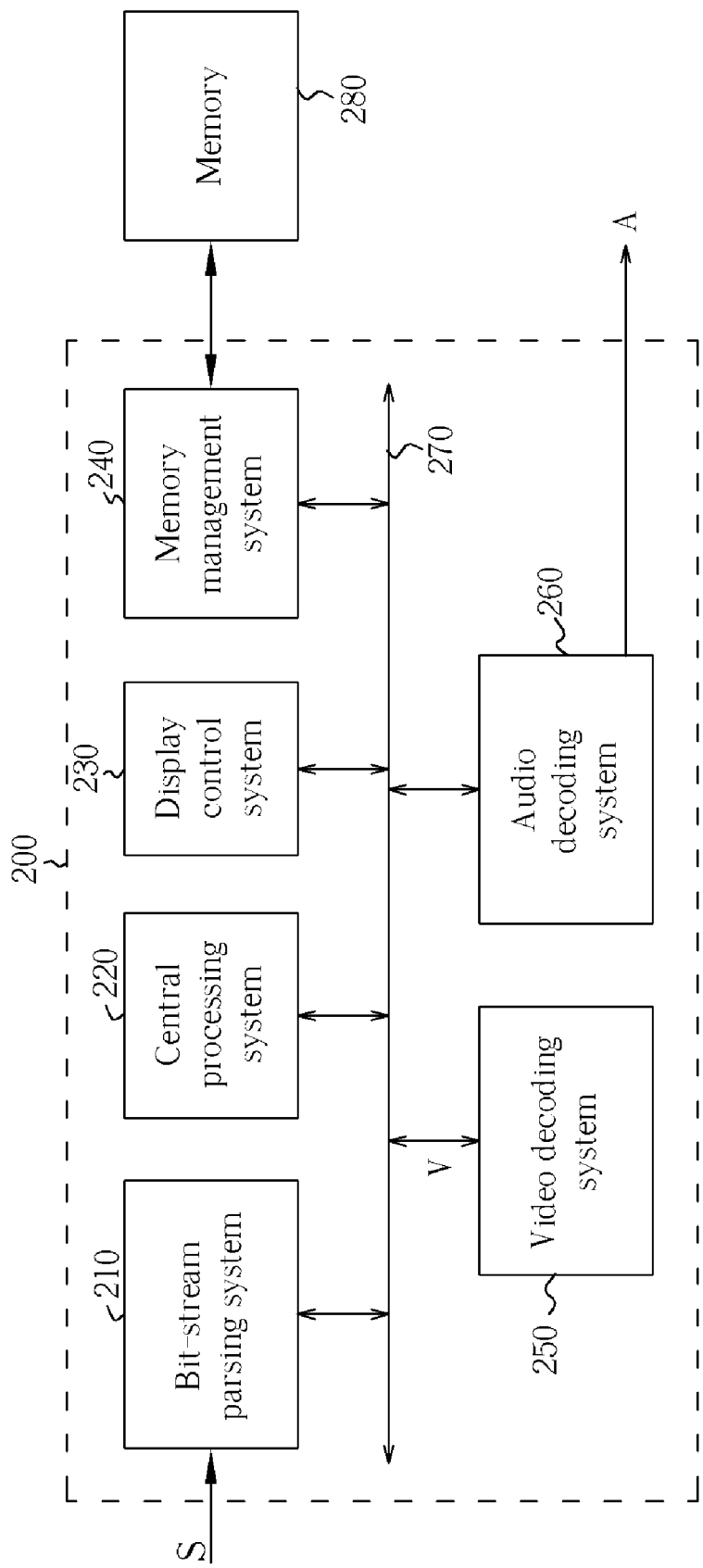
FIG. 10 is a functional block diagram of an exemplary embodiment video playing system.
Figure 11:
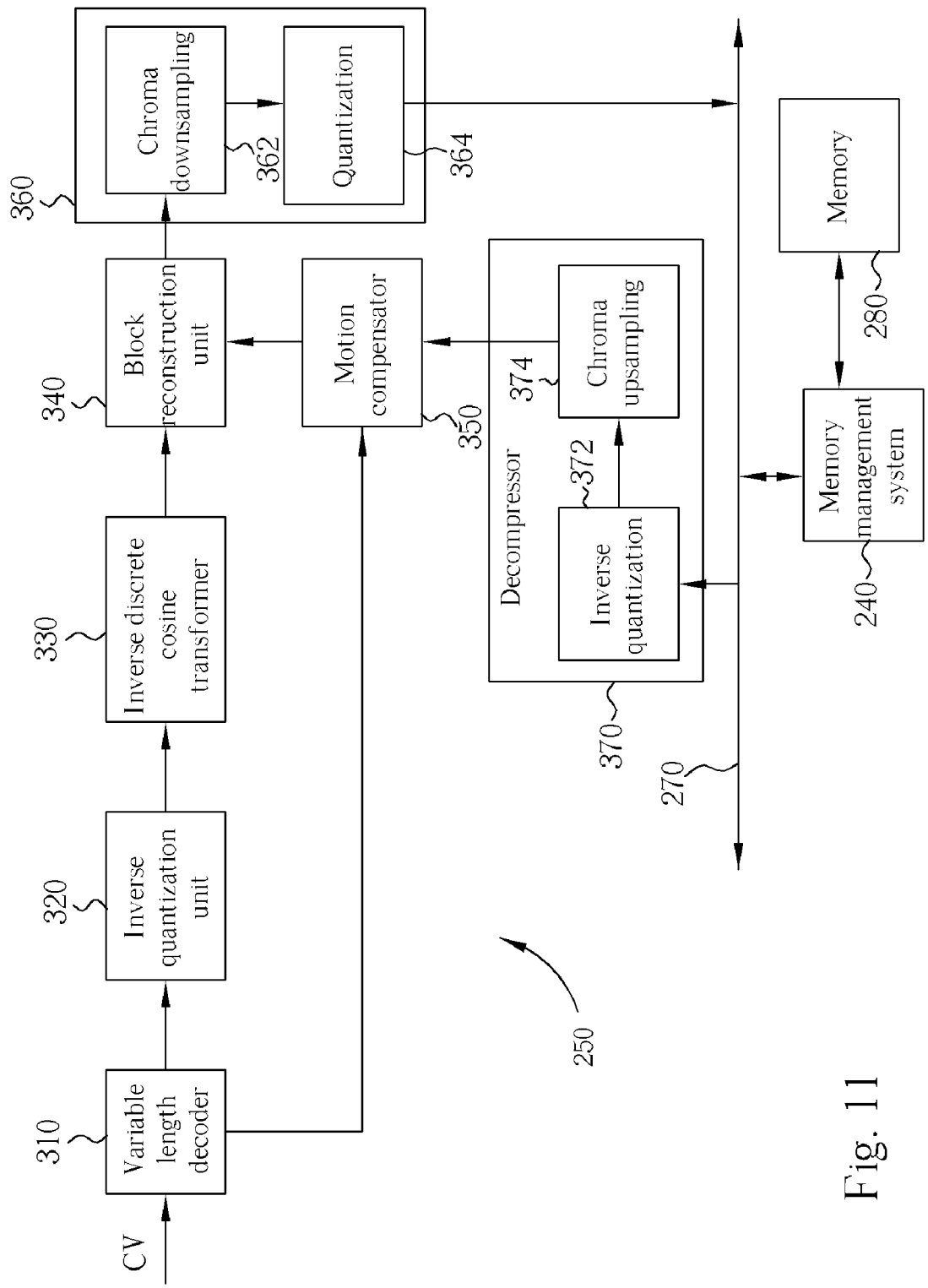
FIG. 11 is a detailed block diagram of a video decoding system shown in FIG. 10.
Figure 12:
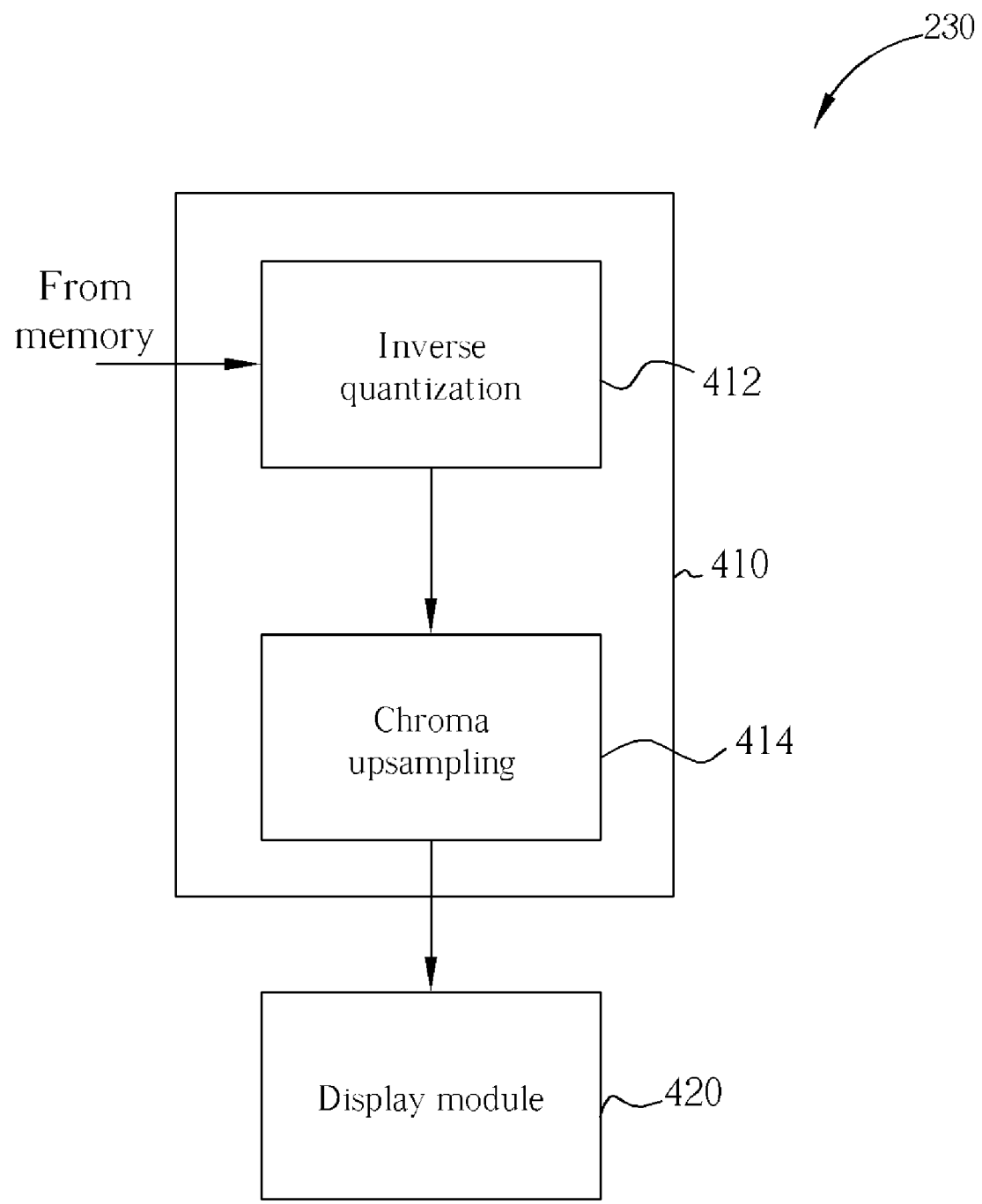
FIG. 12 is a detailed block diagram of a display control system shown in FIG. 10.

Please refer to FIG. 10 to FIG. 12. FIG. 10 is a functional block diagram of an exemplary embodiment video playing system 200. For example, the video playing system 200 can be a DVD player system. FIG. 11 is a detailed block diagram of a video decoding system 250 shown in FIG. 10. FIG. 12 is a detailed block diagram of a display control system 230 shown in FIG. 10. The video playing system 200 is used to decode an incoming bit-stream S into audio A and video V outputs. A bit-stream parsing system 210 receives the MPEG bit-stream S and parses the MPEG bit-stream S into two coded bit-streams: a coded audio bit-stream Ca and coded video bit-stream Cv. These two coded bit-streams Ca and Cv are then stored into a memory 280 via a memory management system 240. Then the bit-stream Ca and Cv are accessed and decoded into audio A and video V, respectively, by an audio decoding system 260 and the video decoding system 250, and the decoded audio A and the decoded video V are again stored into the memory 280 via the memory management system 240. The display control system 230 fetches the decoded video V from the memory 280, and outputs it along with the decoded audio A, for example, to a television set. A central processing system 220 is used to control and coordinate data flow among the systems, and data is transmitted among the systems through a transmission bus 270.

FIG. 11 illustrates the block diagram of the video decoding system 250. The video decoding system includes a variable length decoder (VLD) 310, an inverse quantization unit (IQ) 320, an inverse discrete cosine transformer (IDCT) 330, a block reconstruction unit (BR) 340, a motion compensator (MC) 350, a compressor 360, and a decompressor 370. The VLD 310 receives the video bit-stream Cv and accordingly outputs the first decoded parameters to the IQ 320 and the IDCT 330 for the inverse quantization and inverse discrete cosine transformation operations, and the results after the transformation are then output to the BR 340. The VLD 310 also outputs the second decoded parameters to the MC 350, so that the MC 350 can retrieve prediction blocks from the compressed reference pictures stored in the memory 280 through decompressor 370 and then perform motion-compensation operations. The decompressor 370 contains an inverse quantization module 372 for inverse quantizing the chrominance samples and a chroma upsampling module 374 for performing upsampling operations on the chrominance samples. The chrominance samples of the prediction block fetched from the compressed reference picture are inverse quantized by the inverse quantization module 372, and then chroma upsampled by the chroma upsampling module 374. After that, the restored chroma prediction block can be sent to MC 350 for chrominance motion-compensation operations. As for the luminance prediction block, the decompressor 370 bypasses the luminance prediction block directly without any change and sent it to the MC 350 for luminance motion-compensation operations. A motion-compensated block is sent to the BR 340 by the MC 350. Then, the BR 340 combines both the result from the IDCT 330 and the motion-compensated block from MC 350 to create a reconstructed block of decoded pictures.

The compressor 360 receives the reconstructed block from BR 340 to compress it and stores the compressed video in the memory 280. The compressor 360 contains a chroma downsampling module 362 for performing downsampling operations on chrominance samples and a quantization module 364 for quantizing the chrominance samples. As for the luminance samples of a reconstructed block, the compressor 360 bypasses them directly without any change and stores them into the memory 280. Each of the chroma downsampling module 362 and the quantization module 364 of the compressor 360 are able to reduce the size of the memory 280 that is required to store the chrominance samples. The chroma downsampling module 362 can be used by itself, the quantization module 364 can be used by itself, or both modules can be used together for further reducing the memory requirements. When the chroma downsampling module 362 is used, its counterpart namely the chroma upsampling module 374 is also used. When the quantization module 364 is used, its counterpart namely the inverse quantization module 372 is also used. Note that the quantization operation performed by the quantization module 364 may be uniform scalar quantization with a dithering process, uniform scalar quantization without a dithering process, non-uniform scalar quantization with a dithering process, non-uniform scalar quantization without a dithering process, vector quantization with a dithering process, or vector quantization without a dithering process. In cases where a dithering process is applied before quantization, the quantization module 364 further comprises a random number generator and an adder for dithering. The random number generator generates a random number randomly and the adder adds the random number to the chroma samples. Then, the quantization module 364 performs quantization on the dithered chroma samples from the output of the adder.

As shown in FIG. 12, the display control system 230 contains a decompressor 410 and a display module 420. The decompressor 410 is the functional opposite of the compressor 360 shown in FIG. 11. The decompressor 410 contains an inverse quantization module 412 for performing an inverse quantization process on chrominance samples and a chroma upsampling module 414 for performing upsampling operations on chrominance samples. The decompressor 410 decompresses the compressed chrominance samples before outputting the decompressed chrominance samples to the display module 420.

To achieve varying levels of compression and video quality, chroma downsampling and quantizing can be performed separately or together. In addition, these operations can be performed for both a reference picture and a non-reference picture for further reducing the memory storage requirements. The degree of the chroma downsampling can be varied for controlling the number of chrominance samples stored in memory. Furthermore, quantizing can be performed with uniform or non-uniform scalar quantization or with vector quantization are full search vector quantization (FSVQ) or classified vector quantization (CVQ). Because of the number of operations that can be performed on both the reference picture and the non-reference picture, numerous combinations of memory reduction methods can be performed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method performed by a video player for rendering an MPEG sequence, the method comprising:
    decoding a first picture in the MPEG sequence;
    reducing, by a compressor of the video player, a data size of the decoded first picture by vector quantizing at least one component of the first picture, the quantized component selected from the luminance and chrominance components of the first picture;
    storing a reduced data size representation of the decoded first picture to a frame buffer memory of the video player;
    reading from the frame buffer memory a prediction block of the reduced data size representation of the decoded first picture;
    inverse quantizing, by a decompressor of the video player, the selected component of the prediction block of the reduced data size representation of the decoded first picture to restore the prediction block of the decoded first picture;
    decoding a block of a second picture in the MPEG sequence according to the restored prediction block of the decoded first picture;
    reducing, by the compressor of the video player, a data size of the decoded second picture by vector quantizing the selected component of the second picture;
    storing a reduced data size representation of the decoded second picture to the frame buffer memory of the video player;
    reading from the frame buffer memory the reduced data size representation of the decoded second picture;
    inverse quantizing, by another decompressor of the video player, the selected component of the reduced data size representation of the decoded second picture to restore the decoded second picture; and
    displaying the restored second picture.

2. The method of claim 1, wherein vector quantizing is performed by a full search vector quantization (FSVQ) process.

3. The method of claim 1, wherein vector quantizing is performed by a classified vector quantization (CVQ) process.

4. The method of claim 3, wherein the CVQ process is firstly performed for classifying blocks in the pictures into shade blocks and edge blocks and secondly performed for performing vector quantization on the shade blocks and the edge blocks separately.

5. The method of claim 1, wherein reducing the data size of the decoded first picture further comprises downsampling at least one component of the first picture prior to the vector quantizing.

6. The method of claim 1, wherein the at least one component of the first picture that is vector quantized is the chrominance component of the first picture.

7. A method performed by a video player for rendering an MPEG sequence, the method comprising:
    decoding a first picture in the MPEG sequence;
    adding a randomly generated value to at least one component of the decoded first picture;
    reducing, by a compressor of the video player, a data size of the decoded first picture by quantizing the at least one component of the first picture, the quantized component selected from the luminance and chrominance components of the first picture;
    storing a reduced data size representation of the decoded first picture to a frame buffer memory of the video player;
    inverse quantizing, by a decompressor of the video player, a prediction block of the reduced data size representation of the decoded first picture; and
    decoding a block of a second picture in the MPEG sequence according to the restored prediction block of the decoded first picture;
    reducing, by the compressor of the video player, a data size of the decoded second picture by vector quantizing the selected component of the second picture;
    storing a reduced data size representation of the decoded second picture to the frame buffer memory of the video player;
    reading from the frame buffer memory the reduced data size representation of the decoded second picture;
    inverse quantizing, by another decompressor of the video player, the selected component of the reduced data size representation of the decoded second picture to restore the decoded second picture; and
    displaying the restored second picture.

8. The method of claim 7, wherein quantizing is performed by a vector quantization process.

9. The method of claim 7, wherein quantizing is performed by a scalar quantization process.

10. The method of claim 9, wherein scalar quantizing is performed by a uniform quantization process.

11. The method of claim 9, wherein scalar quantizing is performed by a non-uniform quantization process.

12. The method of claim 7, wherein reducing the data size of the decoded first picture further comprises downsampling at least one component of the first picture.

13. A method performed by a video player for rendering an MPEG sequence, the method comprising:
  decoding a first picture in the MPEG sequence;
  reducing, by a compressor of the video player, a data size of the decoded first picture by downsampling at least one component of the first picture and then quantizing the at least one downsampled component of the first picture, the quantized component selected from the luminance and chrominance components of the first picture;
  storing a reduced data size representation of the decoded first picture to frame buffer memory of the video player;
  reading from the frame buffer memory a prediction block of the reduced data size representation of the decoded first picture;
  inverse quantizing, by a decompressor of the video player, the selected component of the prediction block of the reduced data size representation of the decoded first picture to restore the prediction block of the decoded first
  decoding a block of a second picture in the MPEG sequence according to the restored prediction block of the decoded first picture;
  reducing, by the compressor of the video player, a data size of the decoded second picture by vector quantizing the selected component of the second picture;
  storing a reduced data size representation of the decoded second picture to the frame buffer memory of the video player;
  reading from the frame buffer memory the reduced data size representation of the decoded second picture;
  inverse quantizing, by another decompressor of the video player, the selected component of the reduced data size representation of the decoded second picture to restore the decoded second picture; and
  displaying the restored second picture.

14. The method of claim 13, wherein quantizing is performed by a full search vector quantization (FSVQ) process.

15. The method of claim 13, wherein quantizing is performed by a classified vector quantization (CVQ) process.

16. The method of claim 13, wherein quantizing is performed by a uniform scalar quantization process.

17. The method of claim 13, wherein quantizing is performed by a non-uniform scalar quantization process.

18. An apparatus for rendering an MPEG sequence, comprising:
  a first decoding means for decoding a first picture in the MPEG sequence;
  a data size reducing means for reducing a data size of the decoded first picture by vector quantizing at least one component of the first picture, the quantized component selected from the luminance and chrominance components of the first picture;
  a memory for storing a reduced data size representation of the decoded first picture;
  a means for reading a prediction block of the reduced data size representation of the decoded first picture;
  a decompressor, for inverse quantizing the selected component of the prediction block of the reduced data size representation of the decoded first picture to restore the prediction block of the decoded first picture;
  a second decoding means for decoding a block of a second picture in the MPEG sequence according to the restored prediction block of the decoded first picture; and
  a displaying module;
  wherein the data size reducing means further reduces a data size of the decoded second picture by vector quantizing the selected component of the second picture, the memory further stores the reduced data size representation of the decoded second picture to the frame buffer memory of the video player, the means for reading the prediction block further reads from the frame buffer memory the reduced data size representation of the decoded second picture, the decompressor further inverse quantizes the selected component of the reduced data size representation of the decoded second picture to restore the decoded second picture, and the displaying module displays the restored second picture.

19. The apparatus of claim 18, wherein the vector quantizing is performed by a full search vector quantization (FSVQ) process.

20. The apparatus of claim 18, wherein vector quantizing is performed by a classified vector quantization (CVQ) process.

21. The apparatus of claim 20, wherein the CVQ process is firstly performed for classifying blocks in the pictures into shade blocks and edge blocks and secondly performed for performing vector quantization on the shade blocks and the edge blocks separately.

22. The apparatus of claim 18, wherein the data size reducing means downsamples at least one component of the first picture prior to the vector quantizing.

23. The apparatus of claim 18, wherein the at least one component of the first picture that is vector quantized is the chrominance component of the first picture.

24. An apparatus for rendering an MPEG sequence, comprising:
  a first decoding means for decoding a first picture in the MPEG sequence;
  a data size reducing means for adding a randomly generated value to at least one component of the decoded first picture, and for reducing a data size of the decoded first picture by quantizing the at least one component of the first picture, the quantized component selected from the luminance and chrominance components of the first picture;
  a memory for storing a reduced data size representation of the decoded first picture;
  an inverse quantizer for inverse quantizing a prediction block of the reduced data size representation of the decoded first picture;
  a second decoding means for decoding a block of a second picture in the MPEG sequence according to the restored prediction block of the decoded first picture; and
  a displaying module;
  wherein the data size reducing means further reduces a data size of the decoded second picture by vector quantizing the selected component of the second picture, the memory further stores the reduced data size representation of the decoded second picture to the frame buffer memory of the video player, the inverse quantizer further inverse quantizes the selected component of the reduced data size representation of the decoded second picture to restore the decoded second picture, and the displaying module displays the restored second picture.

25. The apparatus of claim 24, wherein quantizing is performed by a vector quantization process.

26. The apparatus of claim 24, wherein quantizing is performed by a scalar quantization process.

27. The apparatus of claim 26, wherein scalar quantizing is performed by a uniform quantization process.

28. The apparatus of claim 26, wherein scalar quantizing is performed by a non-uniform quantization process.

29. The apparatus of claim 24, wherein reducing the data size of the decoded first picture further comprises downsampling at least one component of the first picture.

30. An apparatus for rendering an MPEG sequence, comprising:
   a first decoding means for decoding a first picture in the MPEG sequence;
   a data size reducing means for reducing a data size of the decoded first picture by downsampling at least one component of the first picture and then quantizing the at least one downsampled component of the first picture, the quantized component selected from the luminance and chrominance components of the first picture;
   a memory for storing a reduced data size representation of the decoded first picture;
   a means for reading a prediction block of the reduced data size representation of the decoded first picture;
   a decompressor, for inverse quantizing the selected component of the prediction block of the reduced data size representation of the decoded first picture to restore the prediction block of the decoded first picture;
   a second decoding means for decoding a block of a second picture in the MPEG sequence according to the restored prediction block of the decoded first picture; and
   a displaying module;
   wherein the data size reducing means further reduces a data size of the decoded second picture by vector quantizing the selected component of the second picture, the memory further stores the reduced data size representation of the decoded second picture to the frame buffer memory of the video player, the means for reading the prediction block further reads from the frame buffer memory the reduced data size representation of the decoded second picture, the decompressor further inverse quantizes the selected component of the reduced data size representation of the decoded second picture to restore the decoded second picture, and the displaying module displays the restored second picture.

31. The apparatus of claim 30, wherein quantizing is performed by a full search vector quantization (FSVQ) process.

32. The apparatus of claim 30, wherein quantizing is performed by a classified vector quantization (CVQ) process.

33. The apparatus of claim 30, wherein quantizing is performed by a uniform scalar quantization process.

34. The apparatus of claim 30, wherein quantizing is performed by a non-uniform scalar quantization process.

* * * * *